(12) United States Patent
Haskara et al.

(10) Patent No.: US 8,437,945 B2
(45) Date of Patent: May 7, 2013

(54) METHOD OF MULTIPLE INJECTION TIMING CONTROL

(75) Inventors: Ibrahim Haskara, Macomb, MI (US); Yue-Yun Wang, Troy, MI (US); Chol-Bum M. Kweon, Bel Air, MD (US); Frederic Anton Matekunas, Troy, MI (US); Oguz H. Dagci, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 426 days.

(21) Appl. No.: 12/775,570

(22) Filed: May 7, 2010

(65) Prior Publication Data

US 2011/0276255 A1 Nov. 10, 2011

(51) Int. Cl.
*F02M 7/28* (2006.01)
(52) U.S. Cl.
USPC ............ 701/105; 701/111; 123/435; 123/299
(58) Field of Classification Search .................. 123/435, 123/299, 300, 305, 494; 701/105, 111
See application file for complete search history.

(56) References Cited

U.S. PATENT DOCUMENTS

| | | | |
|---|---|---|---|
| 7,231,906 B1* | 6/2007 | Haskara et al. | 123/435 |
| 7,337,762 B2* | 3/2008 | Eng et al. | 123/295 |
| 7,594,493 B2 | 9/2009 | Matekunas et al. | |
| 7,904,233 B2 | 3/2011 | Kweon et al. | |
| 2010/0089362 A1 | 4/2010 | Haskara et al. | |
| 2011/0172899 A1 | 7/2011 | Haskara et al. | |

* cited by examiner

*Primary Examiner* — Hai Huynh (57) ABSTRACT

A method for adjusting fuel injection timing in an internal combustion engine including a cylinder and configured to operate multiple fuel injections in the cylinder per combustion cycle includes monitoring in-cylinder pressure through a first combustion cycle, determining actual combustion phasing metrics based upon the in-cylinder pressure, monitoring a baseline fuel injection timing comprising a first injection timing and a second injection timing, providing expected combustion phasing metrics based upon the baseline fuel injection timing, comparing the actual combustion phasing metrics to the expected combustion phasing metrics, and adjusting the baseline fuel injection timing in a second combustion cycle based upon the comparing.

20 Claims, 7 Drawing Sheets

METHOD OF MULTIPLE INJECTION TIMING CONTROL

TECHNICAL FIELD

This disclosure relates to operation and control of internal combustion engines.

BACKGROUND

The statements in this section merely provide background information related to the present disclosure and may not constitute prior art.

Injections in different portions of a combustion cycle have different effects upon the resulting combustion cycle, including effects upon work output of the engine, emissions, and combustion stability. Fuel injection timing in each of multiple fuel injections may be controlled, adjusted, or corrected, for example, by monitoring an engine load and utilizing calibrated values to determine an appropriate timing of each pulse for a multiple injection scheme. However, such methods are only as accurate as the calibration values allow. Further, it will be appreciated that such methods are reactive and include a time lag, controlling engine operation some period after the measurement of the inputs. It will additionally be appreciated that engine output is a term described for an entire engine, and generally cannot provide particular information about the combustion occurring in a particular cylinder.

A variety of intrusive and non-intrusive pressure sensing means are known for sensing pressure within an internal combustion engine cylinder when the engine is motoring and when the engine is firing. In-cylinder pressure measurements can be utilized to estimate different aspects of a combustion cycle. Such pressure measurements can be measured and processed in real time during the operation of the engine. Additionally, such pressure measurements can be tracked on a cylinder-by-cylinder basis.

SUMMARY

A method for adjusting fuel injection timing in an internal combustion engine including a cylinder and configured to operate multiple fuel injections in the cylinder per combustion cycle includes monitoring in-cylinder pressure through a first combustion cycle, determining actual combustion phasing metrics based upon the in-cylinder pressure, monitoring a baseline fuel injection timing comprising a first injection timing and a second injection timing, providing expected combustion phasing metrics based upon the baseline fuel injection timing, comparing the actual combustion phasing metrics to the expected combustion phasing metrics, and adjusting the baseline fuel injection timing in a second combustion cycle based upon the comparing.

BRIEF DESCRIPTION OF THE DRAWINGS

One or more embodiments will now be described, by way of example, with reference to the accompanying drawings, in which.

DETAILED DESCRIPTION

Figure 1:
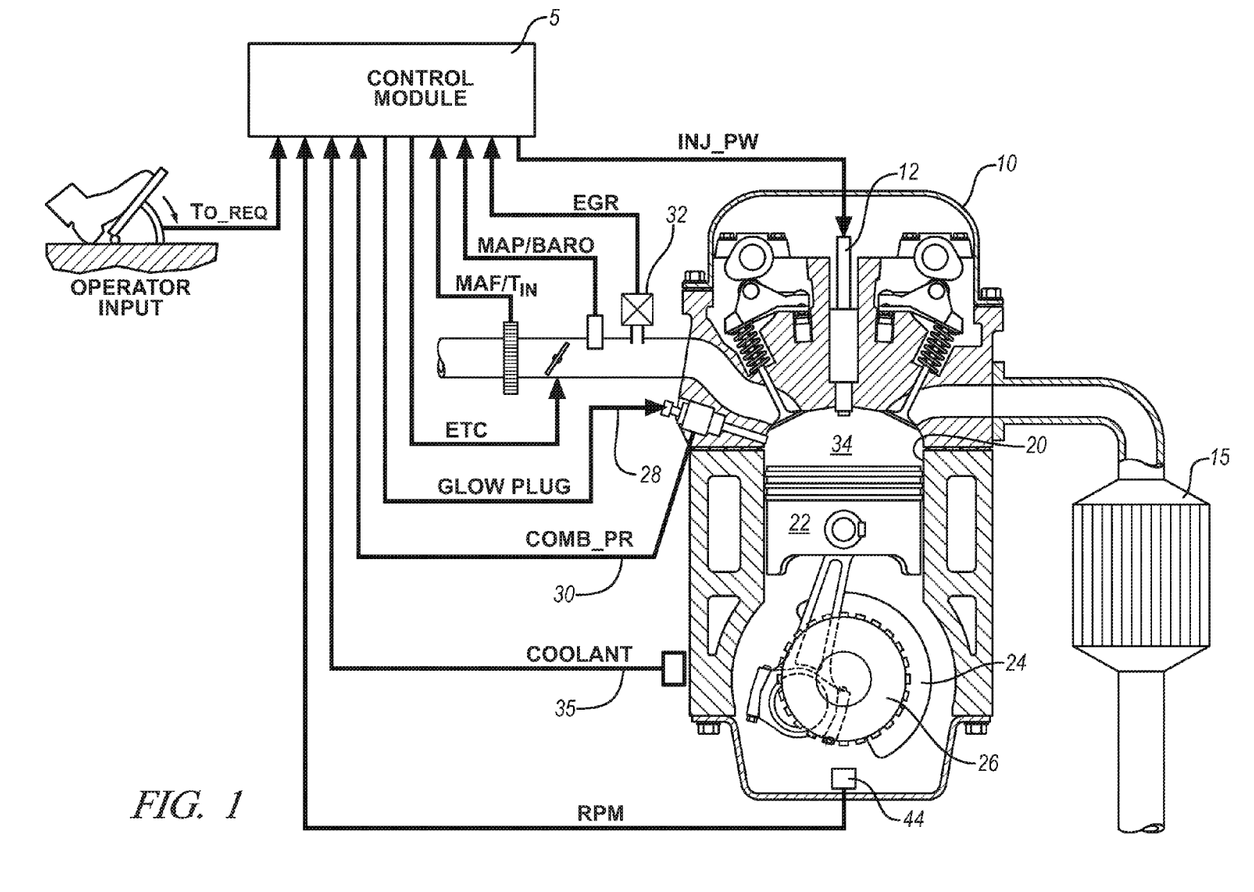
FIG. 1 is a sectional view of an internal combustion engine configured according to an exemplary embodiment of the disclosure.

Referring now to the drawings, wherein the showings are for the purpose of illustrating certain exemplary embodiments only and not for the purpose of limiting the same, FIG. 1 is a schematic diagram depicting an exemplary internal combustion engine 10, control module 5, and exhaust aftertreatment system 15, constructed in accordance with an embodiment of the disclosure. The exemplary engine comprises a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request ($T_{O\_REQ}$). The engine preferably employs a four-stroke operation wherein each engine combustion cycle comprises 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to control module 5.

The engine preferably comprises a direct-injection, four-stroke, internal combustion engine including a variable volume combustion chamber defined by the piston reciprocating within the cylinder between top-dead-center and bottom-dead-center points and a cylinder head comprising an intake valve and an exhaust valve. The piston reciprocates in repetitive cycles each cycle comprising intake, compression, expansion, and exhaust strokes.

The engine preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. In diesel cycle engines, combustion timing is generally coincident with the main fuel injection near top dead center, whereas in controlled auto-ignition or homogeneous charge compression ignition engines fuel injection is earlier in the combustion cycle and ignition timing is controlled near top dead center in accordance with control of in-cylinder conditions (including temperature and pressure) and may include a spark assist from an ignition source during, for example, low speed and low load engine operation.

The engine is adapted to operate over a broad range of temperatures, cylinder charge (air, fuel, and EGR) and injection events. The methods described herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multiple fuel injection events per cylinder per engine cycle, e.g., a system employing a pilot injection for fuel reforming, a main injection event for engine power, and where applicable a post-combustion fuel injection event for aftertreatment management, each which affects cylinder pressure.

Sensing devices are installed on or near the engine to monitor physical characteristics and generate signals which are correlatable to engine and ambient parameters. The sensing devices include a crankshaft rotation sensor, including a crank sensor 44 for monitoring crankshaft speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 (RPM) is input to the control module 5. There is a combustion pressure sensor 30, including a pressure sensing device adapted to monitor in-cylinder pressure (COMB_PR). The combustion pressure sensor 30 preferably includes a non-intrusive device including a force transducer having an annular cross-section that is adapted to be installed into the cylinder head at an opening for a glow-plug 28 in the case of a diesel engine. A spark plug may supplant the glow plug in the case of controlled auto-ignition or homogeneous charge compression ignition engines. The combustion pressure sensor 30 is installed in conjunction with the glow-plug 28, with combustion pressure mechanically transmitted through the glow-plug to the sensor 30. The output signal, COMB_PR, of the sensing element of sensor 30 is proportional to cylinder pressure. The sensing element of sensor 30 includes a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature ($T_{IN}$), and a coolant sensor 35 (COOLANT). The system may include an exhaust gas sensor (not shown) for monitoring states of one or more exhaust gas parameters, e.g., temperature, air/fuel ratio, and constituents. One skilled in the art understands that there may be other sensing devices and methods for purposes of control and diagnostics. The operator input, in the form of the operator torque request, ($T_{O\_REQ}$), is typically obtained through a throttle pedal and a brake pedal, among other devices. The engine is preferably equipped with other sensors for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request ($T_{O\_REQ}$). There is an exhaust gas recirculation valve 32 and cooler, which controls flow of externally recirculated exhaust gas to the engine intake, in response to a control signal (EGR) from the control module. The glow-plug 28 includes a known device, installed in each of the combustion chambers, adapted for use with the combustion pressure sensor 30.

The fuel injector 12 is an element of a fuel injection system, which includes a plurality of high-pressure fuel injector devices each adapted to directly inject a fuel charge, including a mass of fuel, into one of the combustion chambers in response to the command signal, INJ_PW, from the control module. Each of the fuel injectors 12 is supplied pressurized fuel from a fuel distribution system and have operating characteristics including a minimum pulsewidth and an associated minimum controllable fuel flow rate, and a maximum fuel flowrate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $To_{REQ}$, and from the sensors indicating the engine speed (RPM) and intake air temperature ($T_{IN}$), and coolant temperature and other ambient conditions.

In exemplary diesel engine applications, multiple injection strategies enabled by high rail-pressure systems are used for combustion optimization through improved heat release shaping during a combustion event. Among the strategies, split injection and post combustion injection bring additional challenges as compared to standard "main-injection only" combustion since combustion takes place in multiple steps or as multiple stage combustion.

Combustion occurring within the engine is difficult to directly monitor. Sensors may detect and measure fuel flow and air flow into the cylinder, a sensor may monitor a particular voltage being applied to a spark plug or a processor may gather a sum of information that would predict conditions necessary to generate an auto-ignition, but these readings together are merely predictive of combustion and do not measure actual combustion results. Cylinder pressure readings provide tangible readings describing conditions within the combustion chamber. Based upon an understanding of the combustion process, cylinder pressures may be analyzed to estimate the state of the combustion process within a particular cylinder, describing the combustion in terms of both combustion phasing and combustion strength. Combustion of a known charge at known timing under known conditions produces a predictable pressure within the cylinder. By describing the phase and the strength of the combustion at certain crank angles, the initiation and the progression of a particular combustion cycle may be described as an estimated state of combustion. By estimating the state of the combustion process for a cylinder and comparing the state to either expected cylinder readings or to the readings of other cylinders, cylinders may be controlled efficiently based upon comparing monitored operation to desired operation.

Figure 2A:
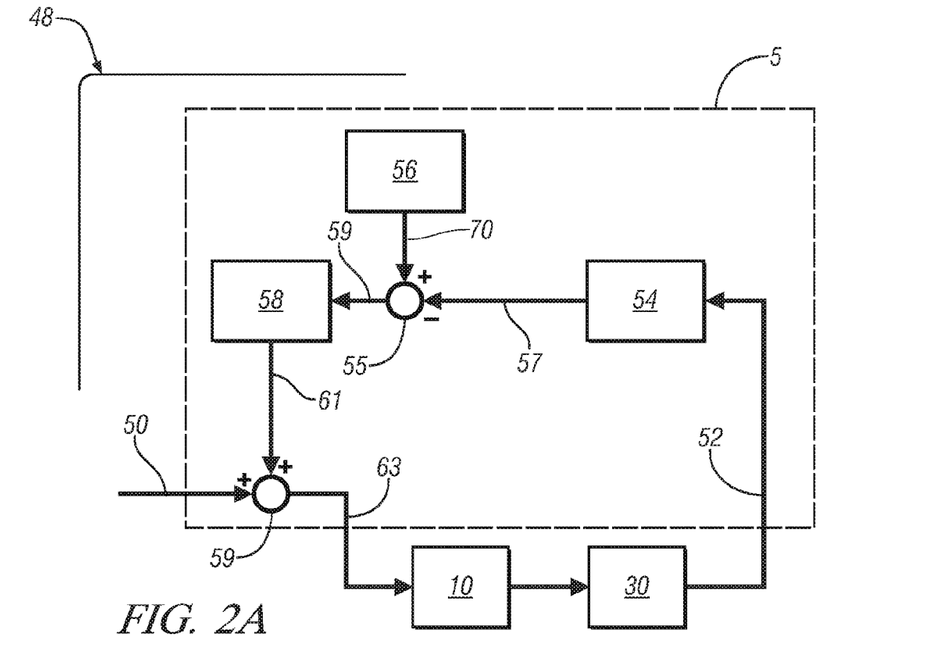
FIG. 2A is a schematic drawing of a multiple injection timing control system to adjust fuel injection timing in an internal combustion engine in accordance with the present disclosure.

Referring now to FIG. 2A, a multiple injection timing control system 48 is illustrated in accordance with an exemplary embodiment of the present disclosure. The multiple injection timing control system 48 provides for individually correcting the timing of multiple injection pulses per combustion event based upon multiple combustion phasing metrics extracted out of a cylinder pressure trace. The multiple injection timing control system 48 includes the control module 5, baseline timing parameters 50, an adder 59, the engine 10, the combustion pressure sensor 30 (see FIG. 1), a phasing metrics unit 54, a difference unit 55, an optimized phasing metrics unit 56, and an injection timing correction feedback unit 58. The baseline timing parameters 50 are based on an operator torque request (To_req), wherein To_req can include operator inputs to actuators including an accelerator pedal and a brake pedal.

Referring to FIGS. 1 and 2, the baseline timing parameters 50 are input to the control module 5 and monitored, wherein the baseline timing parameters 50 convey information relating to an appropriate combustion mode for the engine 10 to operate. As discussed above, combustion modes can include controlled auto-ignition (homogeneous charge compression ignition), homogeneous charge spark-ignition and stratified-charge spark-ignition. The baseline timing parameters 50 and adjustments to baseline timing parameters 61 are input to the adder 59, wherein the control module 5 controls the aforementioned actuators to form compensated timing parameters 63 to the engine 10. The compensated timing parameters 63 can include fuel injection timing locations for pilot, main and post combustion operative for the appropriate combustion mode of the engine 10, while maintaining target phasing targets for optimal combustion in real-time. In an exemplary embodiment of the present disclosure, in-cylinder combustion pressure (P($\theta$)MON) 52 is measured by the combustion pressure sensor 30. It is appreciated that 0 corresponds to the crank angle of the combustion cycle. Thereafter, the P($\theta$)MON 52 is input to—and monitored by—the control module 5, wherein phasing metrics are extracted out of the P($\theta$)MON 52 by the phasing metrics unit 54 to thereby estimate actual phasing metrics 57. Extracting actual phasing metrics 57 from the P($\theta$)MON 52 is operative for individually correcting the timing of multiple injection pulses per cylinder per combustion cycle in real-time on-board combustion control. Furthermore, the multiple injection timing control system 48 is operative as a single system for each individual cylinder 20 in said engine 10, wherein the timing of the injection timing of the cylinders 10 are independent of each other.

Figure 2B:
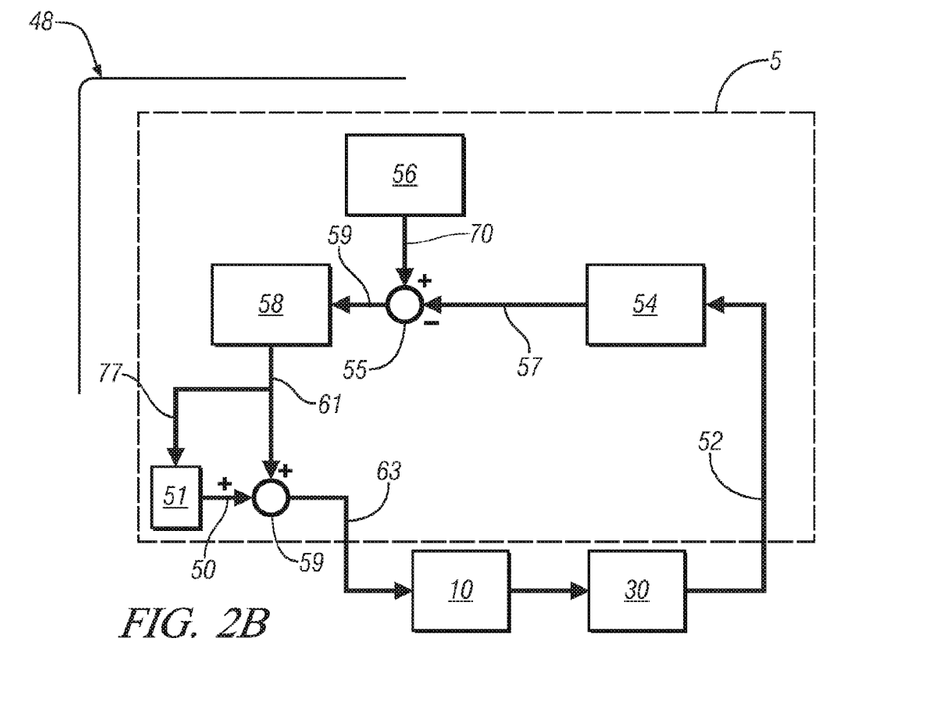
FIG. 2B is the schematic drawing of the multiple injection timing control system shown in FIG. 2A including a feed-forward estimation loop, in accordance with the present disclosure.

Referring to FIG. 2B, feed-forward estimation timing parameters 77 based on the adjustments to baseline timing parameters 61 in a second combustion cycle can be input to an operating point baseline timing unit 51. Based on the feed-forward estimation timing parameters 77, the operating point baseline timing unit 51 can generate baseline timing parameters 50 in the second combustion cycle to be input to the adder 59.

A control methodology where the timing of multiple injection pulses per combustion event can be individually corrected based on multiple phasing metrics extracted out of a cylinder pressure trace is described herein. One having ordinary skill in the art will appreciate that a number of injection strategies and splits may be employed. For example, injections in different parts of the combustion cycle will have different effects. Main injection is typically for combustion controlling torque-forming, pilot injection is typically for controlling noise, and post injection is typically utilized for combustion controlling emissions and exhaust thermal management. Timings and quantities of each pulse for a multiple injection scheme need to be optimized and maintained for optimal fuel economy, emissions, noise and exhaust thermal management. The multiple injection timing control system 48 allows on-board real-time injection timing correction mechanism for timely and reliable multiple-stage combustion against component variations, disturbances and aging. Thus, independent detection and control of each injection pulse per cylinder per combustion cycle allows for maintaining optimal calibration of each pulse.

Figure 3:
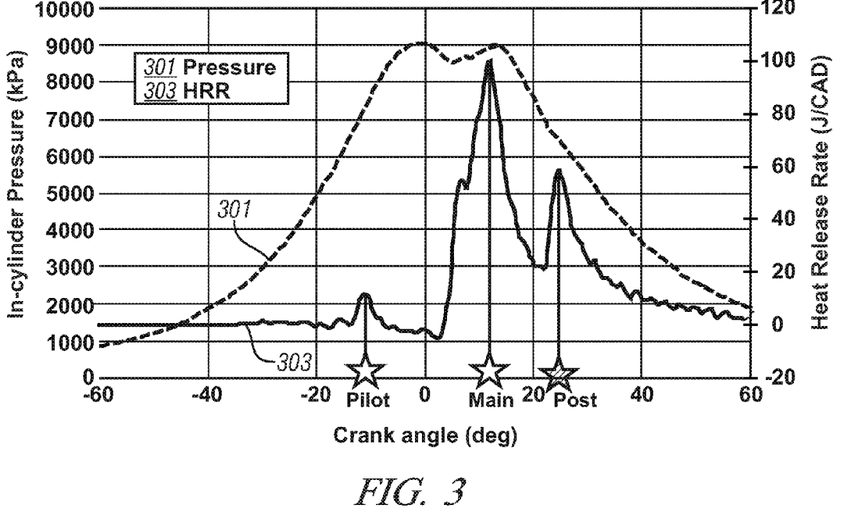
FIG. 3 graphically depicts in-cylinder pressure and heat-release rate profiles for multiple injection timings, in accordance with the present disclosure.

In accordance with an exemplary embodiment of the present disclosure, FIG. 3 is a graphical representation of a multiple phasing control of an in-cylinder combustion pressure profile 301 and a corresponding heat-release rate profile 303 for multiple fuel injections in a cylinder per a combustion cycle. The axis of abscissa represents crank angle (deg) and the axis of ordinate represents in-cylinder pressure (kPa) and heat release rate (J/CAD). As will become apparent, the heat release rate profile 303 can be correlated from an in-cylinder pressure measurement in terms of a change in pressure ratio or a change in combustion pressure rate, measurable according to crank angle. During calibration, the in-cylinder pressure profile 301 and the heat-release rate profile 303 are monitored during a combustion cycle utilizing triple fuel injection. The triple fuel injection includes an injection pulse for pilot, main and post combustion. However, the disclosure is not limited to triple fuel injection and can include double fuel injection including an injection pulse for main and post combustion or an injection pulse for pilot and main combustion. The heat release rate profile 303 locally peaks as a result of each injection pulse (i.e., pilot, main and post combustion), wherein each injection pulse has a crank angle location for a respective local peak value on the heat release rate profile 303. One of the crank angle locations for peak values of the heat release rate profile 303 corresponds to pilot injection, one of the crank angle locations for peak values of the heat release rate profile 303 corresponds to main injection and another of the crank angle locations for peak values of the heat release rate profile 303 corresponds to post injection. By monitoring the in-cylinder combustion pressure profile 301 and determining the crank angle locations for peak values of the heat release rate profile 303, on-board real-time injection timing correction can be provided for timely and reliable multiple-stage combustion against component variations, disturbances and aging. It will be appreciated that this disclosure is concerned with the correlation between the injection timing locations and the crank angle location for each of the peak values on the heat release rate profile 303, and is not concerned with the magnitude of each of the peak values on the heat release rate profile 303.

Figure 4:
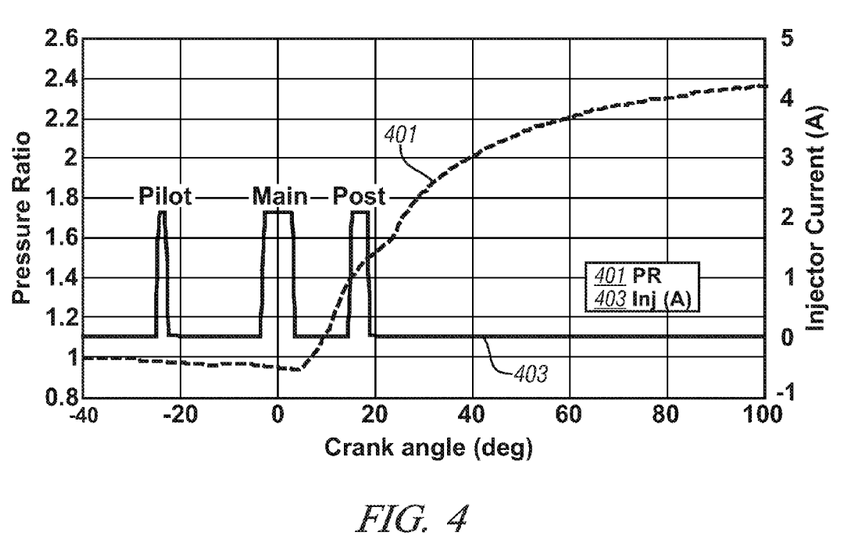
FIG. 4 graphically illustrates a burn profile and injector current profiles for multiple fuel injection timings, in accordance with the present disclosure.

FIG. 4 illustrates a graphical representation of burn and fuel injector current profiles 401, 403, respectively. The burn profile 401 illustrated in FIG. 4, is in fact an estimated burn profile mathematically determined in terms of pressure ratio (PR), measurable according to crank angle. It is appreciated that the estimated burn profile 401 illustrated in FIG. 4 imitates the integral of the heat release rate profile 303 illustrated in FIG. 3. Thus, the estimated burn profile 401 in terms of PR has equivalent behavior as the integral of the heat release rate 303. The estimated burn profile 401 can additionally be determined in terms of combustion pressure or a burned fuel mass fraction, measurable according to crank angle, and will be discussed later (See FIGS. 6B and 7). As shown in FIG. 4, the axis of abscissa represents crank angle location (deg) and the axis of ordinate represents the pressure ratio (PR) and injector current (A). The fuel injector current profile 403 illustrates an increase in current when a pulse of fuel is injected for pilot, main and post combustion. The injection pulse timing for pilot combustion has a crank angle location that substantially occurs at or near −25 degrees. The injection pulse timing for main combustion has a crank angle location that substantially occurs just before top dead center during the compression stroke at or near −4.0 degrees. The injection pulse timing for post combustion has a crank angle location that substantially occurs during the expansion stroke at or near 15.0 degrees. It should be appreciated that the crank angle locations for each injection pulse timing are only exemplary, and this disclosure should not be limited in view thereof. Additionally, the burn profile 401 assists in the determination of crank angle locations for peak values of the heat release rate profiles for main and post injection timings for real-time feedback control discussed in further detail below.

In an exemplary embodiment of the present disclosure, a phasing metric is utilized to estimate burn profiles and respective derivatives (i.e., heat release rates) extracted from monitored in-cylinder pressure measurements through a combustion cycle for main injection timing and post injection timing. It should be appreciated burn and heat release rate profiles can also be estimated through a combustion cycle for pilot injection timing. The exemplary phasing metric determines the burn profile in terms of PR, measurable according to crank angle and the heat release rate profile is determined in terms of change in PR, measurable according to crank angle. Pressure ratio, PR, is a term known in the art to describe a measured pressure within the combustion chamber resulting from combustion, P, above the pressure that would normally be present through operation of the piston, $P_{MOT}$. An estimated burn profile over a range of crank angle locations through each combustion cycle can be calculated in real time by the following equation.

$$PR(\theta) = P/P_{mot} = \frac{P(\theta) * V(\theta)^\gamma}{P(\theta_p) * V(\theta_p)^\gamma} \quad [1]$$

GAMMA, $\gamma$, includes a ratio of specific heats and is nominally chosen as that for air at the temperature corresponding to those used for computing the signal bias and without EGR. Thus, nominally or initially $\gamma=1.365$ for diesel engines and nominally $\gamma=1.30$ for conventional gasoline engines. These can however be adjusted based on the data from the specific heats for air and stoichiometric products using an estimate of the equivalence ratio, $\phi$, and EGR molar fraction targeted for the operating condition and using the following equation.

$$\gamma=1+(R/c_v) \quad [2]$$

R is the universal gas constant, and the weighted average of air and product properties can be calculated through the following equation.

$$c_v(T)=(1.0-\phi*EGR)*c_{vair}(T)+(\phi*EGR)*c_{vstoichprod}(T) \quad [3]$$

Eq. 3 can be expressed as a function to perform property corrections, taking into account various changing property relationships affecting combustion. Eq. 3 can be utilized through a combustion cycle or at every crank angle during all pressure measurement angles starting from an initial temperature. The initial temperature may be at a bias computation point or some other reference such as the intake manifold temperature, measured for example at the intake valve closing angle. This initial temperature and pressure measurements are used to compute a mean temperature at any angle since the temperature undergoes changes similarly to pressure. It will additionally be appreciated that EGR changes through combustion, wherein initially EGR is the EGR percentage of the inducted gas and during the combustion fresh charge mass converts to EGR mass. EGR can accordingly be updated at each crank angle.

An estimated heat release rate profile over a range of crank angle locations for each combustion cycle can be calculated by determining the derivative of the estimated burn profile calculated by Eq. 1 in terms of PR. As such, the estimated heat release rate profile can be calculated in real time by the following equation:

$$\text{Delta PR} = PR(\theta_k) - PR(\theta_{k-1}) \quad [4]$$

wherein Delta PR describes a rate of change in pressure ratio through the combustion cycle, and wherein $PR(\theta_{k-1})$ and $PR(\theta_k)$ are in-cylinder combustion pressure ratios for two iterative pressure samples within a combustion cycle in the engine.

Figure 5A:
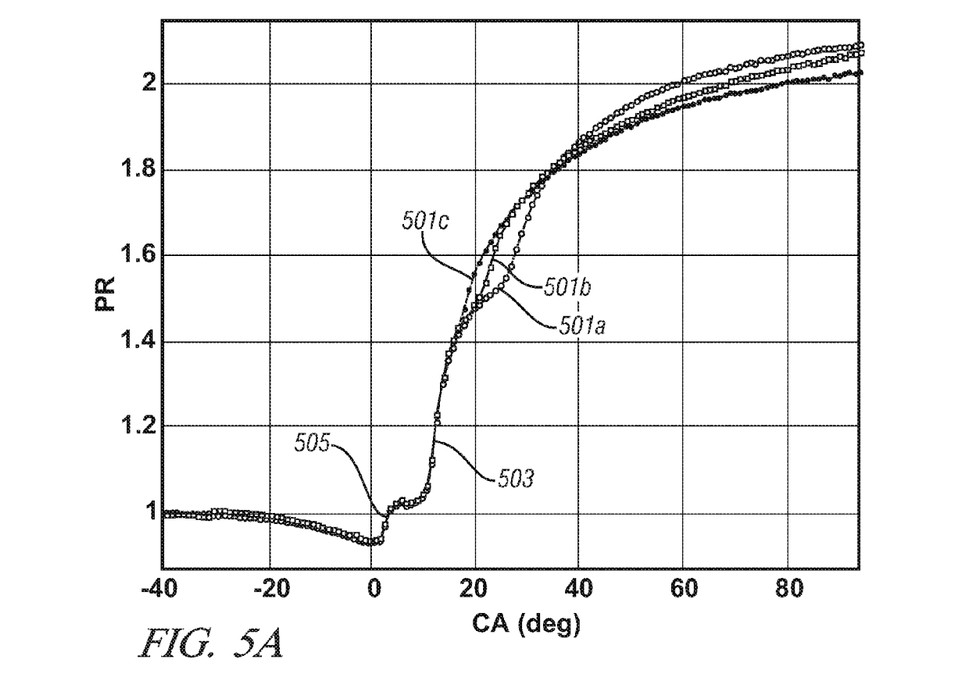
FIG. 5A graphically illustrates an estimated burn profile for multiple injection timings where the axis of abscissa represents the crank angle in degrees and the axis of ordinate represents the pressure ratio, in accordance with the present disclosure.
Figure 5B:
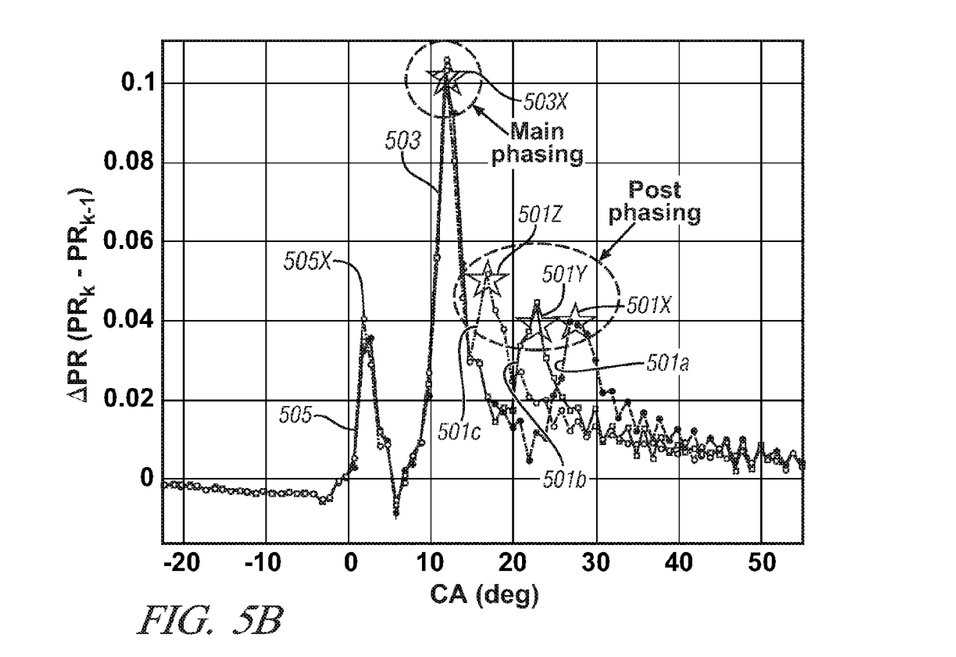
FIG. 5B graphically illustrates the differentiation of the burn profile illustrated in FIG. 5A depicting peak heat-release rate locations where the axis of abscissa represents the crank angle in degrees and the axis of ordinate represents the change in pressure ratio, in accordance with the present disclosure.

FIGS. 5A and 5B depict corresponding test results to varying injection timings. Referring to FIG. 5A, a graph illustrating estimated burn profiles calculated by Eq. 1 for three combustion cycles having varying post injection timing locations 501a, 501b and 501c and a main injection timing location 503 that is the same for all three combustion cycles is depicted. Varying the post injection timing location is only exemplary, and is utilized to illustrate the phasing trends for post injection timing occurring at different timing locations, wherein the phasing trends can be utilized for calibrating expected phasing metrics 70 based upon baseline timing parameters 50 (see FIGS. 2A and 2B). The axis of abscissa represents the crank angle (deg) and the axis of ordinate represents the pressure ratio (PR). It should be appreciated that the three varying post injection timing locations 501a-c each occur during separate combustion cycles whereas the main combustion event for each of the combustion cycles occurs at the same injection timing location.

Referring to FIG. 5B, a graph illustrating estimated heat release rate profiles calculated by Eq. 4 for post injection timing locations 501a, 501b and 501c and the main injection timing location 503 that is the same for all three combustion cycles is depicted. Furthermore, a crank angle location for a peak value of each injection timing can be identified on the heat release rate profiles. For example, the heat release rate profile for main injection timing location 503 has a crank angle location 503X for a corresponding peak change in PR value; the heat release rate profile for post injection timing location 501a has a crank angle location 501X for a corresponding peak change in PR value; the heat release rate profile for post injection timing location 501b has a crank angle location 501Y for a corresponding peak change in PR value and the heat release rate profile for post injection timing location 501c has a crank angle location 501Z for a corresponding peak change in PR value. The axis of abscissa represents the crank angle (deg) and the axis of ordinate represents the change in pressure ratio (ΔPR). As noted in FIG. 5A, the three varying heat release rate profiles for post injection timing locations 501a-c each occur during separate combustion cycles whereas the heat release rate profile for main injection timing location 503 for each of the combustion cycles occurs at the same timing location. Varying the post injection timing location is only exemplary, and is utilized to illustrate the phasing trends for post injection timing occurring at different timing locations. For example, the crank angle location for the injection pulse for post injection timing shown in FIG. 3 is advanced or retarded in three combustion cycles to yield the heat release rate profiles for post injection timing locations 501a-c. It is appreciated that the injection pulse for the heat release rate profile for post injection timing location 501a occurs later in the expansion stroke than the injection pulses for the heat release rate profiles for post injection timing locations 501b and 501c. Whereas the injection pulse for the heat release rate profile for post injection timing location 501b occurs later in the expansion stroke than the injection pulse for the heat release rate profile for post injection timing location 501c.

It will become apparent that the crank angle locations for peak values of the heat release rate profile corresponding to the main injection timing location 503 and one of the post injection timing locations 501a-c can be compared to expected phasing metrics that are based upon the baseline fuel injection timing for main and post injection, respectively. Additionally, the heat release rate profile can include a pilot injection timing location 505 having a crank angle location 505X for a corresponding peak change in PR value.

In another exemplary embodiment of the present disclosure, another phasing metric is utilized to estimate heat release rate profiles and respective integrals (i.e., burn profiles) extracted from monitored in-cylinder pressure measurements. This exemplary phasing metric determines the heat release rate profile in terms of combustion pressure rate (kPa/CAD), measured according to crank angle. The burn profile is determined in terms of combustion pressure, measured according to crank angle. An estimated heat release rate profile over a range of crank angle locations for each combustion cycle can be calculated in real time by the following equation.

$$\text{Combustion Pressure Rate} = P_k - \left(\frac{V_{k-1}}{V_k}\right)^\gamma * P_{k-1} \quad [5]$$

The estimated burn profile in terms of combustion pressure over a range of crank angle locations for each combustion cycle can be calculated by determining the integral of the estimated heat release rate profile calculated by Eq. 5. As such, the estimated burn profile can be calculated in real time by the following equation.

$$\text{Combustion Pressure} = \sum P_k - \left(\frac{V_{k-1}}{V_k}\right)^\gamma * P_{k-1} \quad [6]$$

Figure 6A:
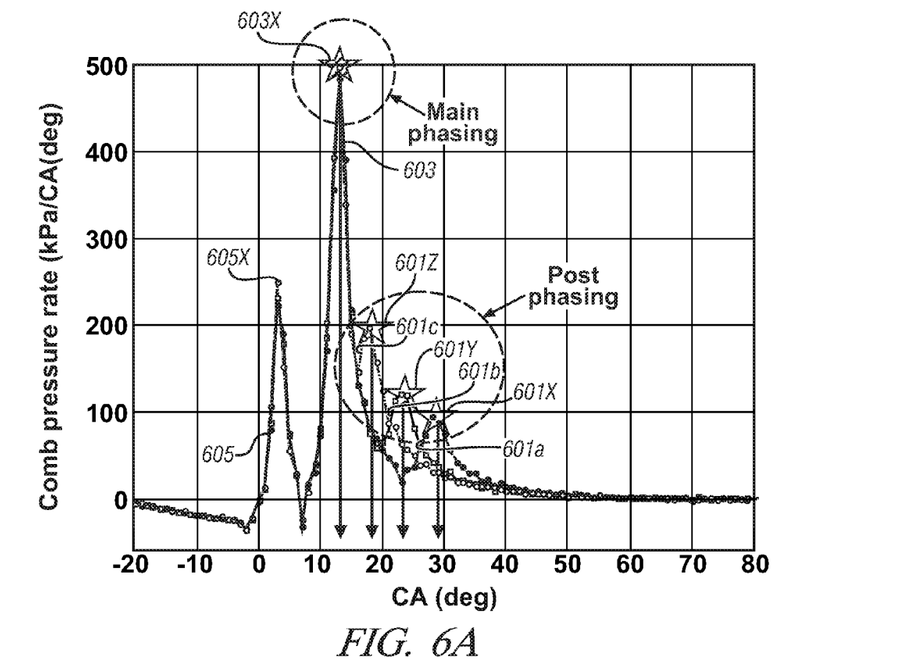
FIG. 6A graphically illustrates estimated heat-release rate profiles having peak heat-release rate locations for multiple injection timings where the axis of abscissa represents the crank angle in degrees and the axis of ordinate represents the combustion pressure rate, in accordance with the present disclosure.

Referring to FIG. 6A, a graph illustrating the estimated heat release rate profiles in terms of combustion pressure rate calculated by Eq. 5 for post injection timing locations 601a, 601b and 601c and a main injection timing location 603 that is the same for all three combustion cycles is depicted. Furthermore, a crank angle location for a peak value of each injection timing can be identified on the heat release rate profiles. For example, main injection timing location 603 has a crank angle location 603X for a corresponding peak combustion pressure rate value; post injection timing location 601a has a crank angle location 601X for a corresponding peak combustion pressure rate value; post injection timing location 601b has a crank angle location 601Y for a corresponding peak combustion pressure rate value and post injection timing location 601c has a crank angle location 601Z for a corresponding peak combustion pressure rate value. The axis of abscissa represents the crank angle (deg) and the axis of ordinate represents the combustion pressure rate (kPa/CAD). The three varying post injection timing locations 601a-c each occur during separate combustion cycles whereas the main injection timing location 603 for each of the combustion cycles occurs at the same timing location. Varying the post injection timing location is only exemplary, and is utilized to illustrate the phasing trends for post injection timing occurring at different timing locations, wherein the phasing trends can be utilized for calibrating expected phasing metrics 70 based upon baseline timing parameters 50 (see FIGS. 2A and 2B). For example, the crank angle location for the injection pulse for post injection timing shown in FIG. 3 is advanced or retarded in three combustion cycles to yield the heat release rate profiles for post injection timing locations 601a-c. It is appreciated that the injection pulse for the heat release rate profile for post injection timing location 601a occurs later in the expansion stroke than the injection pulses for the post injection timing locations 601b and 601c. Whereas the injection pulse for the post injection timing location 601b occurs later in the expansion stroke than the injection pulse for the post injection timing location 601c.

The crank angle locations for peak values of the heat release rate profile corresponding to the main injection timing location 603 and one of the post injection timing locations 601a-c can be compared to the expected phasing metrics 70 that are based upon the baseline fuel injection timing parameters 50 for main and post injection, respectively. Additionally, the heat release rate profile can include a pilot injection timing location 605 having a crank angle location 605X for a corresponding peak change in PR value.

Figure 6B:
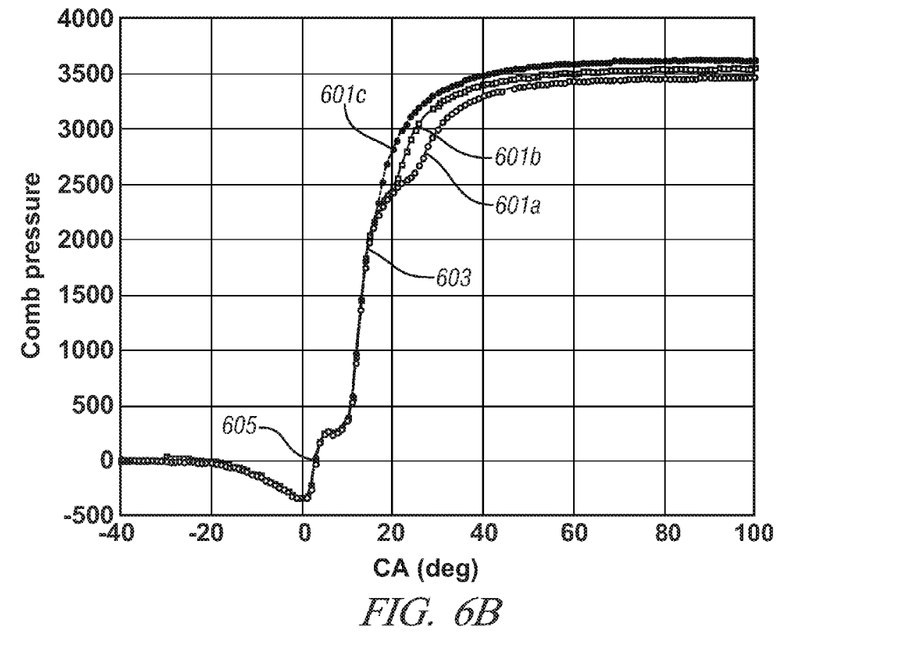
FIG. 6B graphically illustrates the integral of the estimated heat-release rate profiles illustrated in FIG. 6A for multiple injection timings where the axis of abscissa represents the crank angle in degrees and the axis of ordinate represents the combustion pressure, in accordance with the present disclosure.

Referring to FIG. 6B, a graph illustrating estimated burn profiles calculated by Eq. 6 for three combustion cycles having varying post injection timing locations 601a, 601b and 601c and a main injection timing location 603 that is the same for all three combustion cycles is depicted. As mentioned in FIG. 6A, varying the post injection timing location is only exemplary, and is utilized to illustrate the phasing trends for post injection timing occurring at different timing locations, wherein the phasing trends can be utilized for calibrating expected phasing metrics 70 based upon baseline timing parameters 50 (see FIGS. 2A and 2B). The axis of abscissa represents the crank angle (deg) and the axis of ordinate represents the combustion pressure. It should be appreciated that the three varying post injection timing locations 601a-c each occur during separate combustion cycles whereas the main injection event for each of the combustion cycles occurs at the same timing location.

The above examples describe changes that are evident based upon changing a timing of a post injection. It will be appreciated that similar methods can be employed to evaluate changes based upon changes to either main or pilot injections. It will additionally be appreciated that the methods employed herein can apply to multiple changing injection timings simultaneously and need not be employed in isolation to a single injection timing.

Alternative embodiments can utilize a number of permutations of equations to estimate heat release rate profiles. For example, $\Delta m_f$ or the burnt fuel mass between two crank time samples, assuming constant $\gamma$, can be expressed through the following equation.

$$\Delta m_f = \frac{V_{k+1}}{(\gamma - 1) \cdot Q_{LHV}} \left\{ P_{k+1} - P_k \cdot \left(\frac{V_k}{V_{k+1}}\right)^\gamma \right\} \quad [7]$$

Eq. 7 allows for $\gamma$ to be input as a measured, calibrated, computed, or otherwise determinable value. $Q_{LHV}$ is a measure of heat energy in a unit mass of fuel. In another example, $\gamma$ can be allowed to vary through a combustion process, as expressed by the following equation.

$$\Delta m_f = \frac{V_{k+1}}{(\gamma_k - 1) \cdot Q_{LHV}} \left\{ P_{k+1} - P_k \cdot \left(\frac{V_k}{V_{k+1}}\right)^\gamma \right\} \quad [8]$$

Eq. 8 allows use of $\gamma_k$ to describe the effects of changing $\gamma$ through the combustion cycle. A computation of $\gamma$, varying according to temperature and charge mixture estimates, can be directly expressed by the following equation.

$$\Delta m_f = \frac{V_{k+1}}{Q_{LHV}} \left\{ \frac{1}{(\gamma_{T_{k+1}} - 1)} \cdot P_{k+1} - \frac{1}{(\gamma_{T_{exp}} - 1)} \cdot P_k \cdot \left(\frac{V_k}{V_{k+1}}\right)^{\gamma_{T_k}} \right\} \quad [9]$$

It will be appreciated that, when appropriate, use of Eq. 7 is preferred due to simplicity of using a fixed $\gamma$ term. However, when required based upon effects of changing property values or required increased accuracy of the output, Eq. 8 or 9 can be utilized to determine the effects of $\gamma$ through a combustion cycle.

As described above in Eq. 9, $\gamma$ can vary through a combustion process. $\gamma_T$ can be determined according to the following equation.

$$\gamma_T = 1 + R/c_v(T) \quad [10]$$

The term $c_v(T)$ can be determined according to the following equation.

$$c_v(T) = (1 - \phi^* EGR)^* c_{v,air}(T) + {}^*(\phi^* EGR)^* c_{v,stoichprod}(T) \quad [11]$$

Changes to T through a combustion cycle according to $\theta$, starting from an initial temperature and corresponding volume, can be determined according to the following equations.

$$T(\theta_k) = PR(\theta_k) \left(\frac{V_0}{V(\theta_k)}\right)^{\gamma-1} T_0 \quad [12]$$

$$T_{exp}(\theta_k) = T(\theta_k) \cdot \left(\frac{V(\theta_k)}{V(\theta_{k+1})}\right)^{\gamma-1} \quad [13]$$

Similarly, the EGR content within the combustion chamber through a combustion cycle can be determined according to the following equation.

$$EGR(\theta_k) = EGR_{int} + COMB\_RAMP(\theta_k) \cdot (EGR_{final} - EGR_{int}) \quad [14]$$

COMB_RAMP($\theta_k$) is a combustion ramp function, describing combustion progress for crank-resolved values, can be determined according to the following expression.

$$COMB\_RAMP(\theta_k) = \begin{cases} 0 & \text{if } \theta_k < \theta_{comb,\,start} \\ \left(\frac{\theta_k - \theta_{comb,\,start}}{\theta_{comb,\,end} - \theta_{comb,\,start}}\right) & \text{if } \theta_{comb,\,start} \le \theta_k \le \theta_{comb,\,end} \\ 1 & \text{if } \theta_{comb,\,end} < \theta_k \end{cases} \quad [15]$$

Through these equations or through equivalent equations known in the art, a fuel burnt trace can be computed for use in methods described herein.

In an exemplary embodiment of the present disclosure, another phasing metric extracted from monitored in-cylinder pressure measurements can be utilized where the timing of multiple injection pulses per combustion event can be individually corrected. Utilizing the heat release rate integral (i.e., burn profile 401 shown in FIG. 4), each injection timing has a respective output defined in terms of a desired burned fuel mass fraction, measurable according to crank angle. The multiple injection timing outputs are defined as values $CA_{x1}, \ldots, CA_{xn}$, wherein the number of $CA_{xj}$ should be equal to the number of pulses to be controlled. For example, if it is only desirable to control the locations of injection timings for main and post combustion, two $CA_{xj}$ values will be utilized as defined outputs. It will be appreciated that the desired burned fuel mass fractions to be analyzed depend upon the mode of operation of the engine and the location of the injection timing output should be selected such that the last injection pulse dominantly affects the most retarded value to provide a multivariable system with triangular structure on the heat release rate integral. For example, it may be desirable to advance or retard the location for post injection timing in subsequent engine cycles if the desired burned fuel mass fraction correlates to an undesirable affect the location of the post injection timing has on the heat release rate integral. In an exemplary example, the desired burned fuel mass fractions are 0.5 and 0.8 for main and post injection timing, respectively. Therefore, the multiple injection timing outputs are $CA_{50}$ and $CA_{80}$ for main and post combustion, respectively. Likewise, in other combustion cycles it may be desirable to analyze the heat release rate integral where a desired burn mass fuel mass fraction is 0.65 for main combustion and 0.83 for post combustion. Based upon the location of the multiple injection timing outputs $CA_{x1}$ and $CA_{x1}$, measurable according to crank angle, the location of the injection timings for main and post injection timing can be advanced or retarded in subsequent engine cycles in order to meet expected phasing parameters 70 (see FIGS. 2A and 2B) based upon baseline timing parameters 50 for main and post injection timing.

Figure 7:
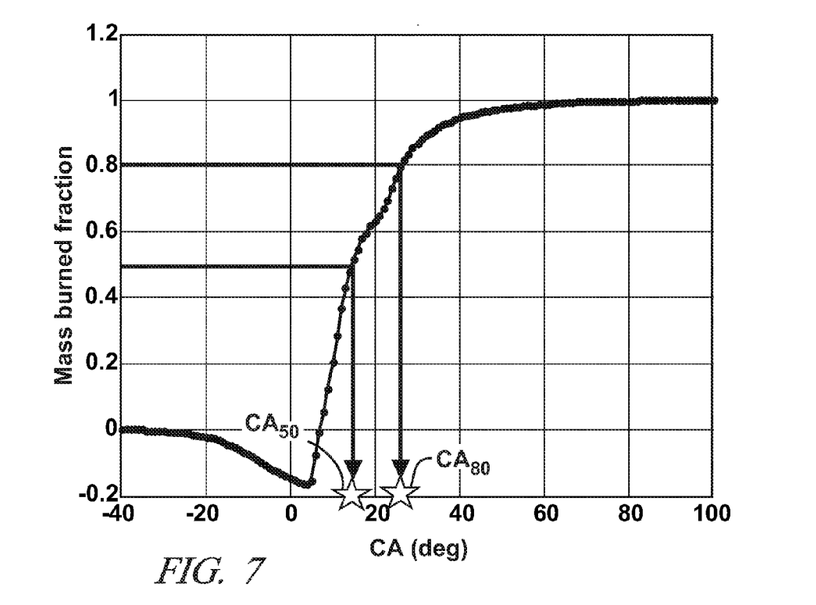
FIG. 7 graphically illustrates an estimated heat-release rate integral for main and post injection timings where the axis of abscissa represents the crank angle in degrees and the axis of ordinate represents the mass fuel burned fraction, in accordance with the present disclosure.

FIG. 7 graphically depicts burned fuel mass fraction through an exemplary combustion cycle, in accordance with the present disclosure. One having ordinary skill in the art will appreciate that in-cylinder pressure measurements can be utilized to calculate the burnt fuel mass fraction as depicted. In the exemplary plot of FIG. 7, a combustion cycle with a two-pulse fuel injection event is depicted, with a first, main injection having a defined main injection timing output of $CA_{50}$ and a second, post injection having a defined post injection timing output of $CA_{80}$. As is evident in the graph, burnt fuel mass fractions by different points in the combustion cycle, measurable according to crank angle degrees, can be defined or determined. Further, according to methods known in the art, periods of main and post injection can be defined and monitored, wherein the period of main injection defines a power output of the cylinder and the period of post injection defines a chemical composition of the exhaust gases expelled from the engine into the exhaust system. It will also be appreciated that a period of pilot injection can also be operated to control factors such as combustion noise. Methods described herein to control main and post injections can similarly be utilized to control pilot injections. Analysis of the heat release rate integral in terms of burnt fuel mass fraction such as depicted in FIG. 7 can be used to describe various properties, for example, describing measured burnt fuel mass fraction for main injection and measured burnt fuel mass fraction for post injection. In the exemplary graph, the main injection timing output $CA_{50}$ (i.e., desired burnt fuel mass fraction is 0.5) occurs at a crank angle location at or near 18 degrees, whereas the post injection timing output $CA_{80}$ (i.e., desired burnt fuel mass is 0.8) occurs at a crank angle location at or near 25 degrees. Adjustments to the locations for main and post injection timings can thereby be made on a cycle by cycle basis, or adjustments can be made based upon a plurality of combustion cycles wherein proper adjustments can be made predictably.

Referring to the multiple injection timing control system 48, in FIGS. 2A and 2B, the actual phasing metrics 57, based upon $P(\theta)_{MON}$ 52, and determined by the one of the exemplary phasing metrics (see FIGS. 5-7) in the phasing metrics unit 54, is input to the differencing 55 and compared with expected phasing metrics 70 provided by the optimized phasing metrics unit 56. The optimized phasing metrics unit 56 determines operating point dependent timing locations and respective expected phasing metrics 70 for injection timing based upon the baseline timing parameters 50. Based on the comparing between the expected and actual phasing metrics 70, 57, respectively, phasing metrics compared 59 is input to the injection timing correction feedback unit 58. The injection timing correction feedback unit 58 analyzes the phasing metrics compared 59 to thereby generate adjustments to the baseline timing parameters 61 in a second combustion cycle. The adjustments to the baseline timing parameters 61 can include adjusting a main injection timing in a second combustion cycle and adjusting a post injection timing in the second combustion cycle. Additionally, the adjustments to the baseline timing parameters 61 can include adjusting a pilot injection timing in a second combustion cycle. The adjustments to the baseline timing parameters 61 are input to the adder 59. The adjustments to the baseline timing parameters 61 in the second combustion cycle are utilized in association with the baseline timing parameters 50 in the second combustion cycle for generation of the compensated timing parameters 63 input to the engine 10 for combustion in the second engine combustion cycle.

Referring to FIG. 2B, feed-forward estimation timing parameters 77 based on the adjustments to baseline timing parameters 61 in the second combustion cycle can be input to an operating point baseline timing unit 51. The feed-forward estimation timing parameters 77 can include a main injection timing feed-forward estimation, a post injection timing feed-forward estimation and a pilot injection timing feed-forward estimation for the second combustion cycle. Based on the feed-forward estimation timing parameters 77, the operating point baseline timing unit 51 can generate baseline timing parameters 50 in the second combustion cycle to be input to the adder 59.

Figure 8:
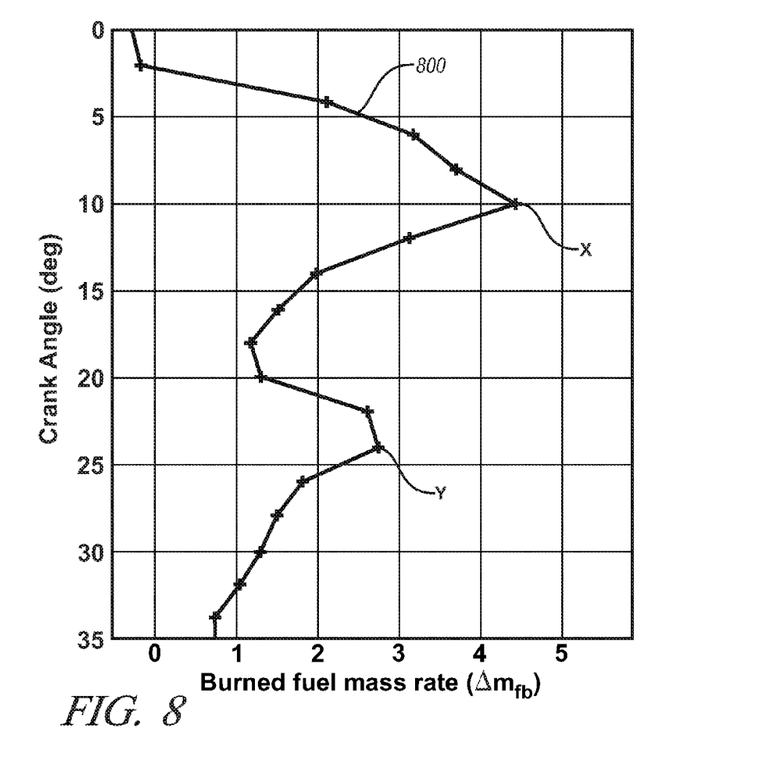
FIG. 8 illustrates a heat release rate profile having peak locations corresponding to main and post combustion and phasing control over a period of time for the main and post combustion peak heat release rate timing locations, in accordance with the present disclosure.

FIG. 8 illustrates a heat release rate profile 800 having crank angle locations for peak values x and y corresponding to injection timings for main and post combustion, respectively. The axis of abscissa represents the crank angle (deg) and the axis of ordinate represents the mass burned fuel rate ($\Delta m_{fb}$).

Figure 9A:
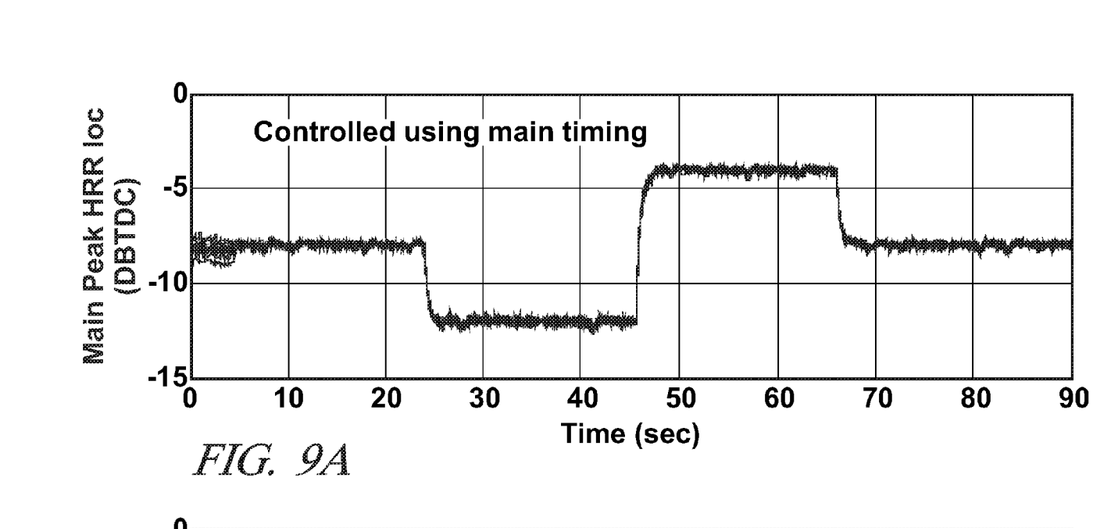
FIGS. 9A and 9B illustrate phasing control for main and post injection timings of multiple combustion cycles, in accordance with the present disclosure.

FIG. 9A illustrates phasing control of injection timing locations for main combustion over multiple combustion cycles. The axis of abscissa represents time (sec) and the axis of ordinate represents the location where the peak heat release rate (DBTDC) occurs. As can be seen by the phasing control method, the timing location for main combustion is varied, and thus, the location for the peak heat release rate value will vary in accordance therewith.

Figure 9B:
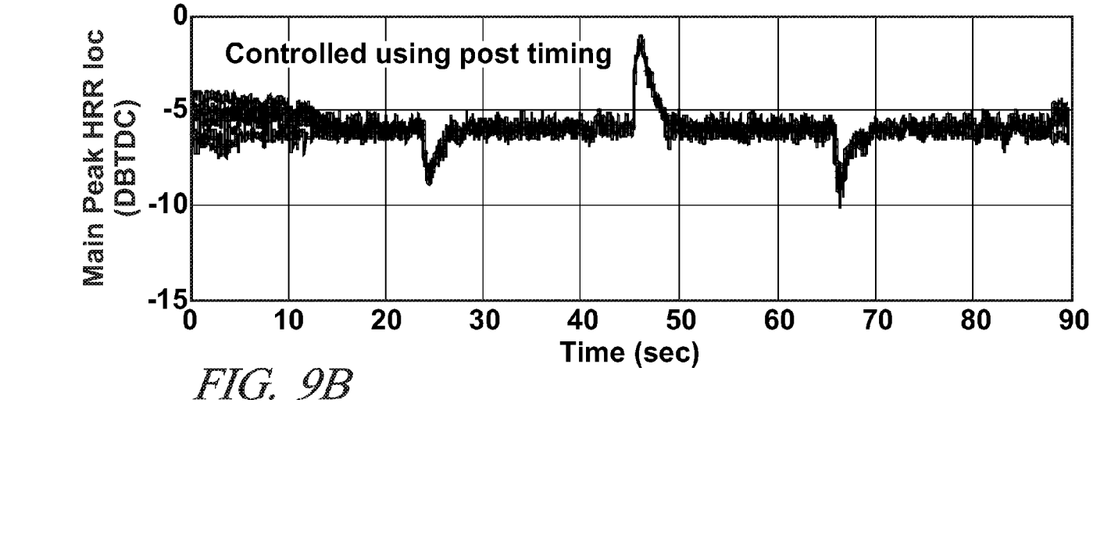

FIG. 9B illustrates phasing control of injection timing locations for post combustion over multiple combustion cycles. The axis of abscissa represents time (sec) and the axis of ordinate represents the location where the peak heat release rate (DBTDC) occurs. As can be seen by the phasing control method, the timing location for post combustion is varied, and thus, the location for the peak heat release rate value will vary in accordance therewith.

The above embodiments are described in relation to a diesel engine configuration utilizing a high rail-pressure systems to deliver fuel to the combustion chamber. However, it will be appreciated that similar methods can be utilized in a variety of engine configurations, including engines utilizing gasoline, ethanol, or other fuels or fuel blends, and the disclosure is not intended to be limited to the particular exemplary embodiments described herein.

The disclosure has described certain preferred embodiments and modifications thereto. Further modifications and alterations may occur to others upon reading and understanding the specification. Therefore, it is intended that the disclo-

The invention claimed is:

1. Method for adjusting fuel injection timing in an internal combustion engine including a cylinder and configured to operate multiple fuel injections in the cylinder per combustion cycle, the method comprising:
   monitoring in-cylinder pressure through a first combustion cycle;
   determining actual combustion phasing metrics based upon the in-cylinder pressure;
   monitoring a baseline fuel injection timing comprising a first injection timing and a second injection timing;
   providing expected combustion phasing metrics based upon the baseline fuel injection timing;
   comparing the actual combustion phasing metrics to the expected combustion phasing metrics; and
   adjusting the baseline fuel injection timing in a second combustion cycle based upon the comparing, wherein one of the first and second injection timings of the base fuel injection timing comprises a main injection timing coincident with a combustion event and defining a power output in the cylinder.

2. The method of claim 1, wherein determining actual combustion phasing metrics comprises:
   determining heat release rates; and
   determining crank angle locations of peak heat release rates.

3. The method of claim 2, wherein determining actual combustion phasing metrics further comprises:
   identifying the one of the crank angle locations of peak heat release rates corresponding to the first injection timing; and
   identifying the one of the crank angle locations of peak heat release rates corresponding to the second injection timing.

4. The method of claim 3, wherein the first injection timing comprises the main injection timing;
   wherein the second injection timing comprises a post injection timing;
   wherein providing expected combustion phasing metrics based upon the baseline fuel injection timing comprises
      providing an expected combustion phasing metric corresponding to the main injection timing, and
      providing an expected combustion phasing metric corresponding to the post injection timing; and
   wherein comparing the actual combustion phasing metrics to the expected combustion phasing metrics comprises
      comparing the crank angle locations of peak heat release rate corresponding to the first injection timing to the expected combustion phasing metric corresponding to the main injection timing, and
      comparing the crank angle location of peak heat release rate profile corresponding to the second injection timing to the expected combustion phasing metric corresponding to the post injection timing.

5. The method of claim 3, wherein the first injection timing comprises a pilot injection timing;
   wherein the second injection timing comprises the main injection timing;
   wherein providing expected combustion phasing metrics based upon the baseline fuel injection timing comprises
      providing an expected combustion phasing metric corresponding to the pilot injection timing, and
      providing an expected combustion phasing metric corresponding to the main injection timing; and
   wherein comparing the actual combustion phasing metrics to the expected combustion phasing metrics comprises
      comparing the crank angle location of peak heat release rate corresponding to the first injection timing to the expected combustion phasing metric corresponding to the pilot injection timing, and
      comparing the crank angle location of peak heat release rate corresponding to the second injection timing to the expected combustion phasing metric corresponding to the main injection timing.

6. The method of claim 2, wherein the baseline fuel injection timing further comprises a third injection timing;
   wherein the first injection timing comprises a pilot injection timing;
   wherein the second injection timing comprises the main injection timing;
   wherein the third injection timing comprises a post injection timing;
   wherein determining actual combustion phasing metrics further comprises
      identifying the one of the crank angle locations of peak heat release rates corresponding to the pilot injection timing,
      identifying the one of the crank angle locations for peak heat release rates corresponding to the main injection timing, and
      identifying the one of the crank angle locations for peak heat release rates corresponding to the post injection timing;
   wherein providing expected combustion phasing metrics based upon the baseline fuel injection timing comprises
      providing an expected combustion phasing metric corresponding to the pilot injection timing,
      providing an expected combustion phasing metric corresponding to the main injection timing, and
      providing an expected combustion phasing metric corresponding to the post injection timing; and
   wherein comparing the actual combustion phasing metrics to the expected combustion phasing metrics comprises,
      comparing the crank angle location of peak heat release rate corresponding to the pilot injection timing to the expected combustion phasing metric corresponding to the pilot injection timing,
      comparing the crank angle location of peak heat release rate corresponding to the main injection timing to the expected combustion phasing metric corresponding to the main injection timing, and
      comparing the crank angle location of peak heat release rate corresponding to the post injection timing to the expected combustion phasing metric corresponding to the post injection timing.

7. The method of claim 2, wherein determining heat release rates is based upon determining rates of change in pressure ratio through the first combustion cycle.

8. The method of claim 1, wherein determining actual combustion phasing metrics comprises determining changes in a combustion rate through the first combustion cycle.

9. The method of 1, wherein determining actual combustion phasing metrics comprises determining rates of change in burnt fuel mass through the first combustion cycle.

10. The method of claim 1, wherein determining actual combustion phasing metrics comprises determining integrals of heat release rates through the first combustion cycle.

11. The method of claim 10, wherein determining actual combustion phasing metrics further comprises:
- identifying a crank angle location of a desired burned mass fraction corresponding to the first injection timing based on the integrals of heat release rates; and
- identifying a crank angle location of a desired burned mass fraction corresponding to the second injection timing based on the integrals of heat release rates.

12. The method of claim 11, wherein the baseline fuel injection timing further comprises a third injection timing;
- wherein determining actual combustion phasing metrics further comprises identifying a crank angle location of a desired burned mass fraction corresponding to the third injection timing based on the integrals of heat release rates;
- wherein the first injection timing comprises a pilot injection timing;
- wherein the second injection timing comprises the main injection timing;
- wherein the third injection timing comprises a post injection timing;
- wherein providing expected combustion phasing metrics based upon the baseline fuel injection timing comprises
  - providing an expected combustion phasing metric corresponding to the pilot injection timing,
  - providing an expected combustion phasing metric corresponding to the main injection timing, and
  - providing an expected combustion phasing metric corresponding to the post injection timing; and
- wherein comparing the actual combustion phasing metrics to the expected combustion phasing metrics comprises
  - comparing the crank angle locations of the desired burned mass fraction corresponding to the pilot timing to the expected combustion phasing metric corresponding to the pilot injection timing,
  - comparing the crank angle locations of the desired burned mass fraction corresponding to the main timing to the expected combustion phasing metric corresponding to the main injection timing, and
  - comparing the crank angle locations of the desired burned mass fraction corresponding to the post timing to the expected combustion phasing metric corresponding to the post injection timing.

13. The method of claim 1, wherein the first injection timing comprises a main injection timing;
- wherein the second injection timing comprises a post injection timing; and
- wherein adjusting the baseline fuel injection timing in the second combustion cycle comprises:
  - adjusting the main injection timing in the second combustion cycle; and
  - adjusting the post injection timing in the second combustion cycle.

14. The method of claim 13, wherein the main injection timing comprises a main injection timing feed-forward estimation;
- wherein the post injection timing comprises a post injection timing feed-forward estimation; and
- wherein adjusting the baseline fuel injection timing in the second combustion cycle further comprises adjusting the main injection timing feed-forward estimation and adjusting the post injection timing feed-forward estimation.

15. Method for adjusting fuel injection timing in an internal combustion engine including a cylinder and configured to operate multiple fuel injections in the cylinder per combustion cycle, the method comprising:
- monitoring in-cylinder pressure through a first combustion cycle;
- monitoring a baseline fuel injection timing comprising a main injection timing and a post injection timing;
- determining actual combustion phasing metrics based upon the in-cylinder pressure, comprising
  - determining a heat release rate profile,
  - identifying a first crank angle location of a local peak heat release rate on the heat release rate profile corresponding to the main injection timing, and
  - identifying a second crank angle location of a local peak value of the heat release rate on the heat release rate profile corresponding to the post injection timing;
- providing expected combustion phasing metrics based upon the baseline fuel injection timing, comprising
  - providing an expected combustion phasing metric corresponding to the main injection timing, and
  - providing an expected combustion phasing metric corresponding to the post injection timing;
- comparing the actual combustion phasing metrics to the expected combustion phasing metrics, comprising
  - comparing the first crank angle location to the expected combustion phasing metric corresponding to the main injection timing, and
  - comparing the second crank angle location to the expected combustion phasing metric corresponding to the post injection timing; and
- adjusting the baseline fuel injection timing in a second combustion cycle based upon the comparing, comprising
  - adjusting the main injection timing in the second combustion cycle, the main injection timing coincident with a combustion event and defining a power output in the cylinder, and
  - adjusting the post injection timing in the second combustion cycle.

16. The method of claim 15, wherein determining a heat release rate profile is based upon determining a change in combustion rate through the first combustion cycle.

17. Apparatus for adjusting fuel injection timing in an internal combustion engine including a cylinder and configured to operate multiple fuel injections in the cylinder per combustion cycle, comprising:
- a fuel injection system;
- a pressure sensor monitoring an in-cylinder pressure; and
- a control module
  - monitoring the in-cylinder pressure through a first combustion cycle,
  - determining actual combustion phasing metrics based upon the in-cylinder pressure,
  - monitoring a baseline fuel injection timing comprising a first injection timing and a second injection timing,
  - providing expected combustion phasing metrics based upon the baseline fuel injection timing,
  - comparing the actual combustion phasing metrics to the expected combustion phasing metrics, and
  - generating commands to the fuel injection system comprising adjustments to the baseline fuel injection timing in a second combustion cycle based upon the comparing, wherein one of the first and second injection timings of the base fuel injection timing comprises a main injection timing coincident with a combustion event and defining a power output in the cylinder.

18. The apparatus of claim 17, wherein said internal combustion engine is a homogeneous charge compression ignition engine.

19. The apparatus of claim 17, wherein said internal combustion engine is an stratified-charge spark-ignition engine.

20. The apparatus of claim 17, wherein said internal combustion engine is a homogenous charge spark-ignition engine.

* * * * *